Nov. 21, 1939.   A. S. MENASCO   2,180,599
MULTIPLE MOTOR DRIVE
Filed March 10, 1936
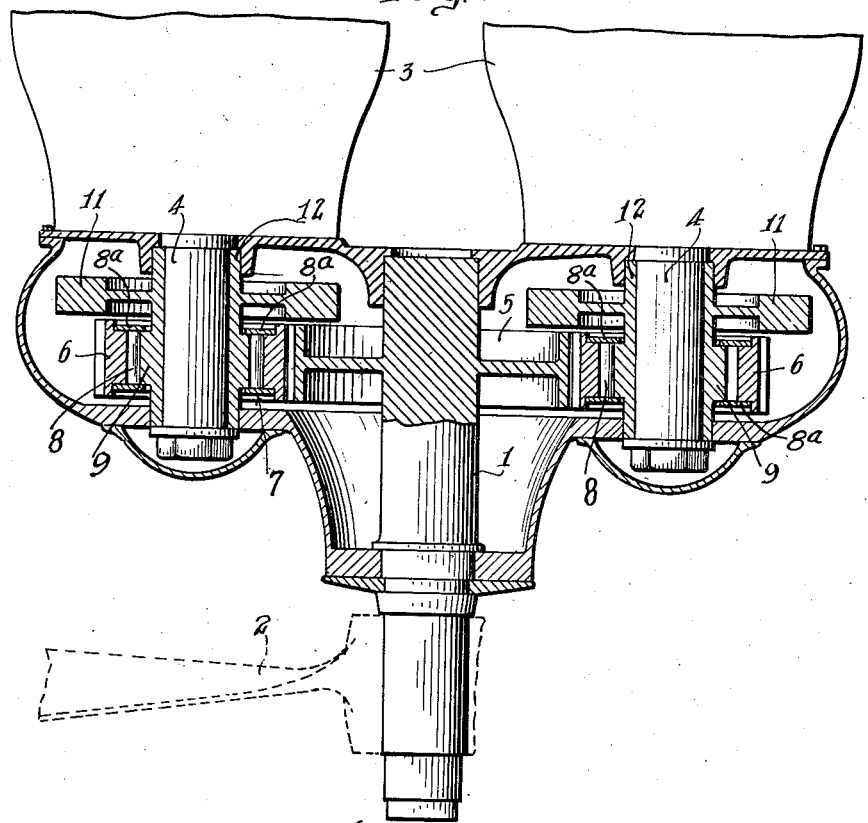
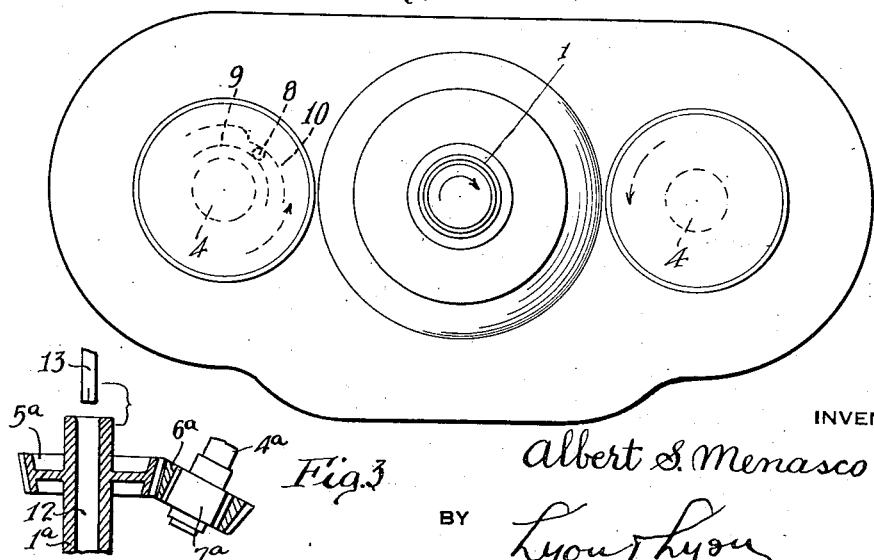
INVENTOR.
Albert S. Menasco
BY Lyon & Lyon
ATTORNEYS Patented Nov. 21, 1939

2,180,599

UNITED STATES PATENT OFFICE 2,180,599

MULTIPLE MOTOR DRIVE

Albert S. Menasco, Beverly Hills, Calif., assignor, by mesne assignments, to Vega Airplane Company, Burbank, Calif., a corporation of California Application March 10, 1936, Serial No. 68,069

7 Claims. (Cl. 74—389)

This invention relates to a multiple motor drive of general application, and more particularly to a multiple motor drive particularly applicable to provide the driving mechanism of the propeller of an aircraft.

It is a common practice to employ a group of propellers, for example, two or three, for driving an aircraft; and each propeller is usually driven by its own motor by driving means which is independent of all of the other motors and propellers. As a result of this, if one of the motors becomes inactive for any reason, the drive for the aircraft becomes unbalanced, and this unbalanced condition is aggravated by the fact that the propeller of the "dead" or idling motor is not rotating. The failure of independent driving units on aircraft such as this, has been the cause of many forced landings and many accidents.

One of the objects of this invention is to provide a driving mechanism for a propeller of an aircraft, in which a single propeller is driven by a group of motors, and in such a way that if any one of the motors becomes incapacitated the other motors will continue the driving of the propeller, and without rotating the "dead" motor. The improvement may be applied to an aircraft driven by a single propeller actuated by a group of motors, and it is also quite applicable to an aircraft design in which the aircraft is driven by a plurality of propellers, for example, two or three, each propeller being driven by its own group of motors. In either case, if one of the motors becomes incapacitated the propeller will continue to revolve under power. Where the improvement is applied to an aircraft which is driven by several propellers, the incapacitating of one of the motors would merely reduce the power of the drive to the propeller driven by one group of motors, and it would be substantially impossible for an accident to be so extensive as to bring about the incapacity of any propeller.

In the preferred construction, to practice the invention the propeller shaft is provided with a gear wheel with which the pinions driven by the motors mesh; and one of the objects of the invention is to locate the pinions with reference to the gear wheel of the propeller shaft, in such a way that the thrust exerted by the pinion drives upon the gear wheel, will be substantially balanced thereby avoiding the development of any substantial lateral thrust against the propeller shaft which would cause the concentration of pressure and wear upon the bearings for the propeller shaft.

Further objects of the invention will appear hereinafter.

The invention consists in the novel parts and combination of parts to be described hereinafter, all of which contribute to produce an efficient multiple motor drive.

A preferred embodiment of the invention is described in the following specification, while the broad scope of the invention is pointed out in the appended claims.

In the drawing:

Figure 1 is a plan of a more or less diagrammatic nature, indicating the relation of two motors with driving means for driving a propeller shaft from the same in accordance with my invention. In this view certain parts are broken away, and certain parts shown partially in section; the propeller is indicated in dotted lines.

Fig. 2 is a front elevation of the parts illustrated in Fig. 1, but omitting the outline of the motors at the back. This view particularly illustrates the direction of rotation of the motor shafts and the propeller shaft.

Before proceeding to a more detailed description of the invention, it should be stated that in accordance with my invention, I provide a group of motors having shafts located so that the motor shafts are out of axial alignment with the propeller shaft. I provide gearing for driving the propeller shaft from each of the motor shafts, and this gearing includes an overrunning clutch corresponding to each motor. With this arrangement each drive clutch operates to disconnect the drive from its motor in case its motor becomes incapacitated, thereby permitting the propeller shaft to be driven by the remaining active motors of the group. Although any number of motors may be employed for driving one of the propellers of the aircraft, in the present specification and drawing I have described the improvement as applied to the construction in which two motors are employed for driving the propeller shaft.

Referring more particularly to the parts and especially to Figs. 1 and 2, I indicates the propeller shaft which would be mounted in suitable bearings, and which projects at the forward end so as to carry a propeller 2 indicated in dotted lines in Fig. 1.

In the present instance this shaft 1 is driven by two motors 3, which may be of any type, and these motors are mounted so that their shafts 4 are out of axial alignment with the shaft 1, but so that the centers of the three shafts are substantially in a straight line (see Fig. 2). As illustrated in Fig. 1, the shafts 4 are parallel with the shaft 1, but this is not essential to the practice of the invention, as will appear hereinafter. Between the motor shafts 4 and the propeller shaft 1, I provide gearing for driving the propeller shaft from each motor shaft, and this gearing includes an overrunning or one-way drive clutch so that the power of the two shafts 4 can be transmitted to the propeller shaft. In the present instance this gearing comprises a main gear wheel 5 rigid with the propeller shaft 1. Each motor shaft 4 is provided with an annular driving pinion 6 meshing with the gear wheel 5 for driving the same, but this pinion 6 is not rigid with its corresponding motor shaft 4, but is driven from the same through an overrunning clutch 7 preferably including a plurality of rollers 8 (see Fig. 2), secured at their ends rotatably in centering rings 8a countersunk into the end faces of the pinions 6; the rollers are mounted around a cylindrical hub 9 and rolling at their outer sides against a plurality of cam faces 10. The rings 8a also seat against the ends of the hubs 9. They operate to center the pinions 6 on the hubs 9. Clutches of this type are in common use, and enable the drive to be effected in one direction only. In the present instance, assuming that the propeller shaft 1 would rotate in a clockwise direction, then the two motors would rotate in an anti-clockwise direction, as indicated by the arrows in Fig. 2. Each motor shaft 4 is preferably provided with its own fly wheel 11, and in the present illustration this fly wheel is illustrated as being formed integral with a sleeve 12, which sleeve is rigid on the motor shaft 4; and on this sleeve the cylindrical hub 9 is formed that forms a part of the one-way clutch driven by the motor shaft.

In the arrangement of motors illustrated in Fig. 1, it is evident that if desired, more than two motors may be employed for driving the propeller shaft.

It will be evident that if one of the driving motors becomes incapacitated, the other motor or motors of the group will continue the rotation of the propeller shaft. Furthermore, by reason of the overrunning clutches employed, the propeller shaft 1 will not drive the motor shaft. Hence the motor can come to rest and will not be driven by the propeller shaft. This relieves the propeller shaft of considerable friction, and enables the development of a greater amount of power by the remaining active motors for driving the propeller shaft.

One of the advantages of my improvement is that the gear wheels through which the propeller shaft is driven from the motors, are constantly in mesh with each other.

In this driving mechanism the centers of the driving pinions 6 are preferably located substantially diametrically opposite to each other with reference to the gear wheel 5 that is carried by the propeller shaft. The result of this is that the thrusts of the pinion teeth of the two pinions during the drive are balanced, and they develop a driving couple tending to produce a rotation of the propeller shaft without developing any lateral thrust on the shaft which would press the same against a side of the propeller shaft bearing.

It is understood that the embodiment of the invention described herein is only one of the many embodiments this invention may take, and I do not wish to be limited in the practice of the invention, nor in the claims, to the particular embodiment set forth.

What I claim is:

1. A drive mechanism for aircraft comprising, a driven shaft adapted to drive a propeller and having a gear wheel secured thereon, a plurality of drive shafts for driving the propeller shaft, a drive pinion carried by each drive shaft and meshing with said gear wheel, inertia means secured to each drive shaft, said inertia means having an axially extended hub portion, an overrunning clutch interposed between each extended hub portion and each drive pinion, whereby the propeller shaft may be driven by any one or all of said drive shafts, and whereby the inertia means on any running drive shaft produces a fly-wheel effect irrespective of whether its associated clutch is driving or overrunning.

2. A drive mechanism for aircraft comprising, a propeller shaft having a gear wheel thereon, a plurality of drive shafts for driving the propeller shaft, a driving pinion carried by each drive shaft and meshing with said gear wheel, a driving sleeve secured to each drive shaft, each driving sleeve being interposed between a driving pinion and its respective drive shaft, an overrunning clutch interposed between each driving sleeve and its associated driving pinion, and inertia means carried by each of said driving sleeves, said inertia means being carried on said sleeve adjacent the respective driving pinions.

3. A drive mechanism for aircraft comprising, a plurality of drive shafts; an inertia mass adapted to produce a fly-wheel effect mounted on each drive shaft; a driven propeller shaft; and gearing interposed between each inertia mass and said propeller shaft, said gearing having an overrunning clutch incorporated therein, whereby a given running drive shaft can drive said propeller shaft without imparting rotation to another drive shaft.

4. A drive mechanism for aircraft comprising, a plurality of drive shafts; an inertia mass adapted to produce a fly-wheel effect mounted on each drive shaft; a driven shaft adapted to drive a propeller; a gear on said driven shaft; a pinion interposed between each inertia mass and said gear; and an overrunning roller clutch associated with each of said pinions, said drive shafts and pinions being arranged relatively to said driven shaft so that the lateral thrust on the driven shaft is substantially balanced.

5. A drive mechanism for aircraft comprising, a pair of drive shafts; an inertia mass adapted to produce a fly-wheel effect mounted on each drive shaft; a driven propeller shaft; a gear on said propeller shaft; a pinion interposed between each said inertia mass and said propeller shaft and meshing with said gear, said pinions being arranged upon diametrically opposite sides of said gear to balance the lateral thrust on said propeller shaft; and an overrunning roller clutch associated with each of said pinions whereby a given pinion may overrun with respect to its associated drive shaft.

6. A drive mechanism for aircraft comprising, a driven propeller shaft; means for driving said propeller shaft including a drive shaft having an inertia mass mounted thereon to produce a fly-wheel effect; and gearing interposed between said inertia mass and said propeller shaft, said gearing having an overrunning clutch incorporated therein, whereby said propeller shaft can overrun said drive shaft.

7. A drive mechanism for aircraft comprising, a driven propeller shaft; a gear secured to said propeller shaft; a drive shaft for driving said propeller shaft; a fly-wheel mounted on said drive shaft, said fly-wheel having an extended hub portion; a pinion carried by said hub portion and meshing with the gear on said propeller shaft; and a one-way clutch between said hub and said pinion, whereby the propeller shaft can overrun the drive shaft.

ALBERT S. MENASCO.